(12) United States Patent
Schirdewahn

(10) Patent No.: US 8,259,624 B2
(45) Date of Patent: Sep. 4, 2012

(54) DYNAMIC PICTURE LAYOUT FOR VIDEO CONFERENCING BASED ON PROPERTIES DERIVED FROM RECEIVED CONFERENCING SIGNALS

(75) Inventor: Jochen Christof Schirdewahn, Stabekk (NO)

(73) Assignee: Cisco Technology, Inc., San Jose, CA (US)

( * ) Notice: Subject to any disclaimer, the term of this patent is extended or adjusted under 35 U.S.C. 154(b) by 1412 days.

(21) Appl. No.: 11/553,703

(22) Filed: Oct. 27, 2006

(65) Prior Publication Data

US 2008/0100696 A1    May 1, 2008

(51) Int. Cl.
*H04L 12/16* (2006.01)
*H04Q 11/00* (2006.01)

(52) U.S. Cl. ........ 370/265; 370/260; 370/261; 370/262; 370/263; 370/264; 348/14.08; 348/14.09; 348/14.1; 455/416

(58) Field of Classification Search ........................ None
See application file for complete search history.

(56) References Cited

U.S. PATENT DOCUMENTS

| | | | |
|---|---|---|---|
| 5,600,646 A | 2/1997 | Polomski | |
| 5,682,207 A * | 10/1997 | Takeda et al. | 348/568 |
| 6,404,745 B1 | 6/2002 | O'Neil et al. | |
| 7,034,860 B2 | 4/2006 | Lia et al. | |
| 2004/0230651 A1* | 11/2004 | Ivashin | 709/204 |
| 2004/0257433 A1* | 12/2004 | Lia et al. | 348/14.09 |
| 2005/0122392 A1* | 6/2005 | Johansen et al. | 348/14.09 |
| 2005/0259144 A1* | 11/2005 | Eshkoli | 348/14.07 |
| 2006/0087553 A1* | 4/2006 | Kenoyer et al. | 348/14.08 |

* cited by examiner

*Primary Examiner* — Jae Y Lee
(74) *Attorney, Agent, or Firm* — Oblon, Spivak, McClelland, Maier & Neustadt, L.L.P.

(57) ABSTRACT

A method and apparatus for conferencing dynamically determines composite image layout based on properties of received conferencing signals that include video signals and control signals. Video signals received from connected sites are processed to provide a composite video signal according to the defined composite image layout and the composite video signal is transmitted to the connected sites. Upon a change in properties of one or more received video signals, the composite image layout may be redefined. The received video signals are processed according to the redefined composite image layout to provide a second composite video signal that is transmitted to the connected sites.

8 Claims, 8 Drawing Sheets

DYNAMIC PICTURE LAYOUT FOR VIDEO CONFERENCING BASED ON PROPERTIES DERIVED FROM RECEIVED CONFERENCING SIGNALS

BACKGROUND

Video conferencing systems allow for simultaneous exchange of audio, video and data information among multiple conferencing sites or endpoints. Systems known as multipoint control units (MCUs) perform switching functions to allow multiple sites to intercommunicate in a conference. The MCU links the sites together by receiving frames of conference signals from the sites, processing the received signals, and retransmitting the processed signals to appropriate sites. The conference signals include audio, video, data and control information. In a switched conference, the video signal from one of the conference sites, typically that of the loudest speaker, is broadcast to each of the participants. In a continuous presence conference, video signals from two or more sites are spatially mixed to form a composite video signal for viewing by conference participants. The continuous presence or composite image is a combined picture that may include live video streams, still images, menus or other visual images from participants in the conference.

In a typical continuous presence conference, the video display is divided into a composite layout having areas or regions (e.g., quadrants). Sites are selected at conference setup from the sites connected in the conference for display in the regions. Common composite layouts include four, nine or sixteen regions. The layout is selected and then fixed for the duration of the conference.

Some conference arrangements provide different composite signals or video mix such that each site may view a different mix of sites. Another arrangement uses voice activated quadrant selection to associate sites with particular quadrants. That arrangement enables conference participants to view not only fixed video mix sites, but also a site selected on the basis of voice activity. However, the layout in terms of number of regions or quadrants is fixed for the conference.

Videoconferencing endpoints are capable of sending and receiving video signals with a greater variety of values for picture properties, such as picture aspect ratio and picture resolution. For example, some endpoints can send video signals with a picture aspect ratio of 16:9 or 4:3. While most endpoints can display a picture aspect ratio of 4:3, some endpoints can more optimally display a picture aspect ratio of 16:9. Some endpoints are capable of sending or receiving a small maximum picture size such as 176×144 pixels ("QCIF") while others are capable of sending or receiving a large maximum picture size such as 1280×720 ("w720p").

SUMMARY

A typical MCU may have a layout controller that generates a composite image that is composed of sub-pictures each having a picture aspect ratio of 4:3. However, the MCU has to crop a received 16:9 aspect ratio picture or else use a frame ("letterbox") to fit the 16:9 image into the 4:3 sub-picture. Either approach reduces the quality impression of the composite image.

U.S. Pat. No. 7,034,860, incorporated herein by reference in its entirety, describes a composite image layout approach that is based on the number of sites connected to a conference or the number of received video signals or both. However, such an image layout with many small sub-pictures may produce a reduced quality impression if the overall resolution of the composite image is low and the number of pixels available for the sub-pictures on the display of the receiving endpoint becomes too small.

There is a need for a conferencing capability that enables conference sites to receive composite video signals that present an appropriate or best impression based on properties derived from received conferencing signals. There is a further need to have the best impression be provided dynamically as one or more of these properties change during a conference.

Accordingly, the present approach provides a method and apparatus for conferencing that dynamically determines composite image layout based on properties of received conferencing signals. The conferencing signals include video signals and control signals. The properties may be derived from the video signals or the control signals or both. Video signals received from connected sites are processed to provide a composite video signal according to the defined composite image layout and the composite video signal is transmitted to the connected sites. Upon a change in properties of one or more received video signals, the composite image layout may be redefined. The received video signals are processed according to the redefined composite image layout to provide a second composite video signal that is transmitted to the connected sites.

According to one aspect, the picture aspect ratio of the received video signals may be used to select an appropriate image layout where the participants are displayed in sub-pictures which have an aspect ratio that complies with the aspect ratio of the 1:5 received pictures.

According to another aspect, the picture resolution of the received video signals may be used to select an appropriate image layout where the participants are displayed in sub-pictures which have a size relative to the picture resolution of the received picture.

According to another aspect, the picture resolution of the video signal generated by the MCU may be used to select an appropriate image layout where the sub-picture size does not fall below a certain threshold.

BRIEF DESCRIPTION OF THE DRAWINGS

The foregoing and other features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A video teleconferencing system capable of continuous presence conferencing is described in U.S. Pat. No. 5,600,646, the entire teachings of which are incorporated herein by reference. That system, with certain modifications, is now described briefly herein followed by a description of the continuous presence configuration of the present invention.

The term "site" is used to refer collectively to a location having an audiovisual endpoint and a conference participant or user, or simply to an endpoint.

Figure 1:
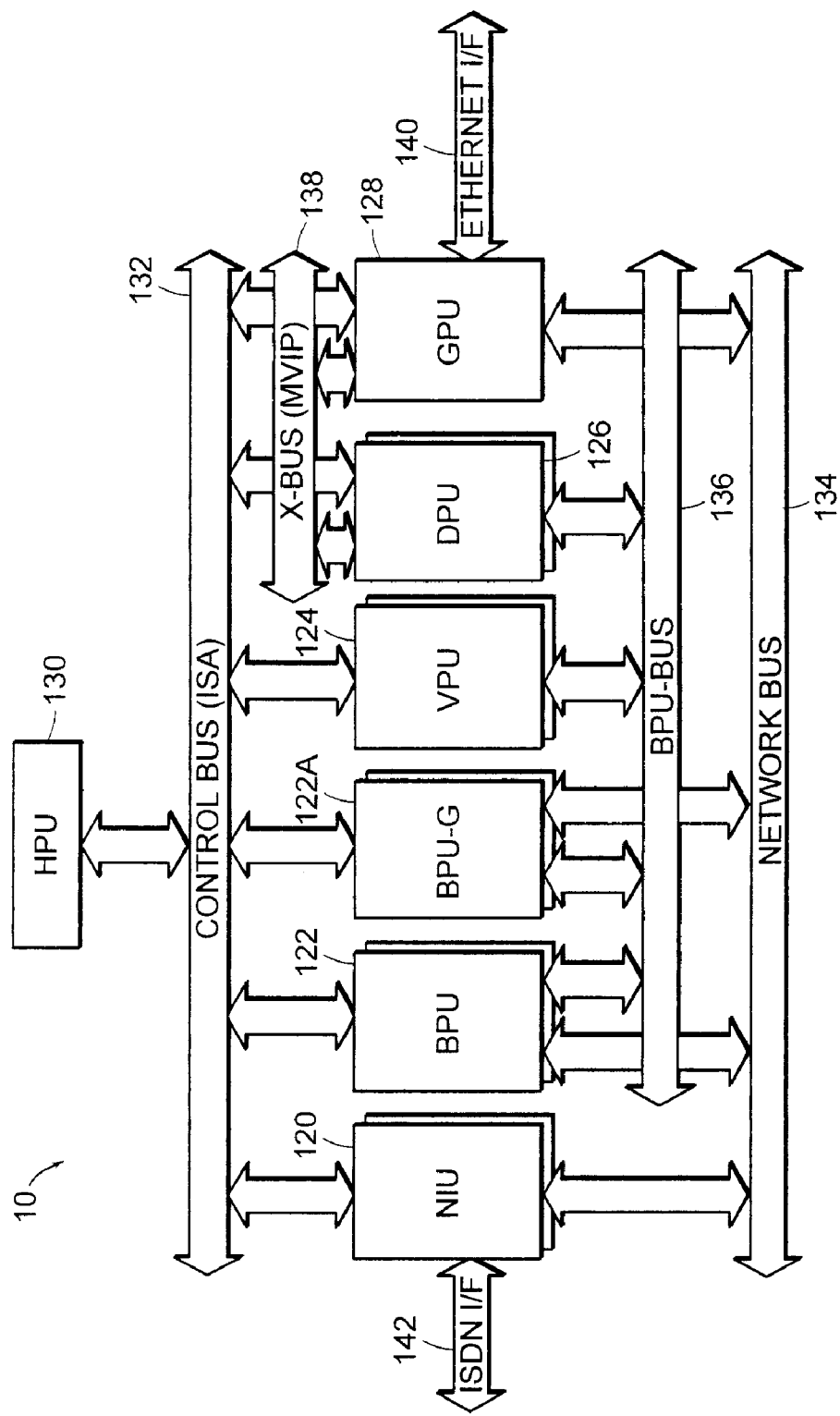
FIG. 1 is a block diagram of an MCU configuration.

Referring now to FIG. 1, there is shown an embodiment of an MCU 10 of the type disclosed in the above-referenced U.S. Pat. No. 5,600,646. The MCU 10 also includes H.323 functionality as disclosed in U.S. Pat. No. 6,404,745 (incorporated herein by reference in its entirety). In addition, video processing in the MCU has been enhanced, as will be described further herein. The features described herein for MCU 10 can be embodied in an MCU available from TANDBERG.

The MCU 10 includes at least one Network Interface Unit (NIU) 120, at least one Bridge Processing Unit (BPU) 122, a Video Processing Unit (VPU) 124, a Data Processing Unit (DPU) 126, and a Host Processing Unit (HPU) 130. In addition to a host Industry Standard Architecture (ISA) control bus 132, the MCU 10 includes a network bus 134, a BPU bus 136 and an X-bus 138. The network bus 134 complies with the Multi-Vendor Integration Protocol (MVIP) while the BPU bus 136 and the X-bus are derivatives of the MVIP specification. The HPU 130 provides a management interface for MCU operations. Each of the foregoing MCU elements is further described in the above-referenced U.S. Pat. Nos. 5,600,646 and 6,404,745.

The H.323 functionality is provided by the addition of a Gateway Processing Unit (GPU) 128 and a modified BPU referred to as a BPU-G 122A. The GPU 128 runs H.323 protocols for call signaling and the creation and control of audio, video and data streams through an Ethernet or other LAN interface 140 to endpoint terminals. The BPU-G 122A is a BPU 122 that is programmed to process audio, video and data packets received from the GPU 128.

The MCU operation is now described at a high-level, initially for circuit-based conferencing and then for packet-based H.323 conferencing. In circuit-based conferencing, digital data frames from H.320 circuit-based endpoint terminals are made available on the network bus 134 through a network interface 142 to an NIU 120. The BPUs 122 process the data frames from the network bus 134 to produce data frames which are made available to other BPUs 122 on the BPU bus 136. The BPUs 122 also extract audio information from the data frames. The audio information is decoded to PCM data and made available on the BPU bus 136 for mixing with audio from other H.320 terminals by respective BPUs 122 in a conference. The BPUs 122 combine compressed video information and mixed encoded audio information into frames that are placed on the network bus 134 for transmission to respective H.320 terminals.

In a standard conference, the BPUs 122 perform video switching within a conference by selecting video data frames from timeslots on the BPU bus 136 and routing the frames to respective terminals in the conference. A particular BPU 122 selects the appropriate video data frames based upon a conference selection process. Typically, the selection process is based upon a comparison of the voice levels of the conference sites. The loudest conference site is designated the current broadcaster to be viewed by all other conference locations while the current broadcaster typically views another site. In other conference selection processes, an MCU operator or a particular audiovisual terminal operating in a chair control mode selects a site as the current broadcaster.

In cases where the audiovisual terminals operate at different transmission rates or with different compression algorithms or are to be mixed into a composite image, multiple video inputs are sent to the VPU 124 where the video inputs are decompressed, mixed and recompressed into a single video stream. This single video stream is then passed back through the BPU 122 which switches the video stream to the appropriate endpoint terminals.

For packet-based H.323 conferencing, the GPU 128 makes audio, video and data packets available on the network bus 134. The data packets are processed through the DPU 126. The BPU-G 122A processes audio and video packets from the network bus 134 to produce audio and video broadcast mixes which are placed on the network bus 134 for transmission to respective endpoint terminals through the GPU 128. In addition, the BPU-G 122A processes audio and video packets to produce data frames which are made available to the BPUs 122 on the BPU bus 136. In this manner, the MCU 14 serves a gateway function whereby regular BPUs 122 and the BPU-G 122A can exchange audio and video between H.320 and H.323 terminals transparently.

Figure 2:
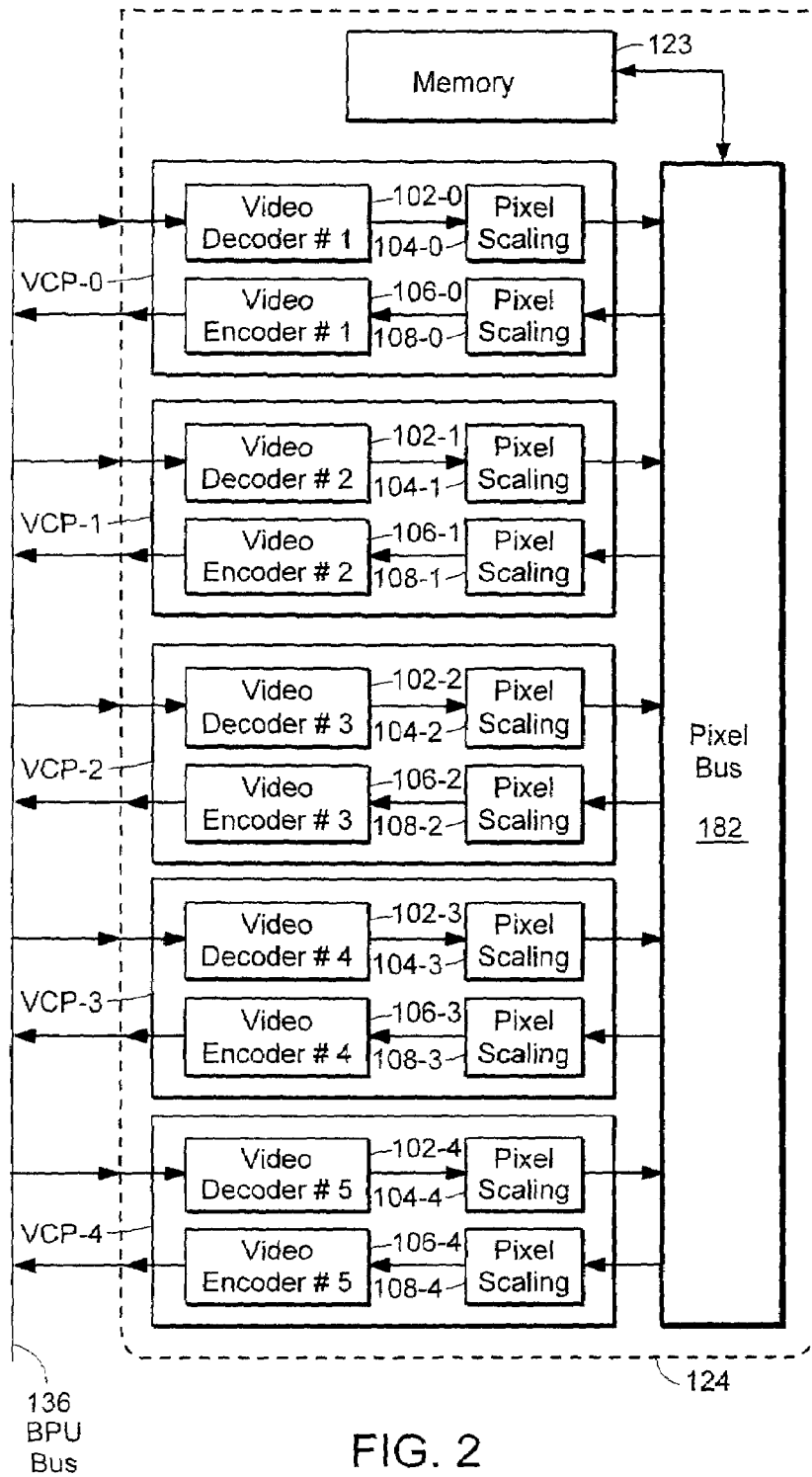
FIG. 2 is a schematic block diagram of an embodiment of a VPU.

Having described the components of the MCU 10 that enable the basic conference bridging functions, a high level description of the flexibility provided by the VPU 124 is now described with reference to the functional block diagram of FIG. 2. In the MCU 10, compressed video information from up to five audiovisual terminals that are in the same conference is routed to a particular VPU 124 over the BPU bus 136. The VPU 124 comprises five video compression processors (VCP0-VCP4), each having a video decoder/encoder pair 102-$i$, 106-$i$, and pixel scaling blocks 104-$i$, 108-$i$.

A video decoder/encoder pair 102-$i$, 106-$i$ is assigned to the compressed video information stream associated with each particular site in the conference. Each video decoder 102-$i$ decodes the compressed video information using the algorithm that matches the encoding algorithm of its associated site. Included as part of the video decoder 102-$i$ may be the processing to determine the framing, packets, and checksums that may be part of the transmission protocol. It should be noted that a processor encoded video stream can be assigned to multiple sites (e.g., a continuous presence application having more than five sites in the conference). In addition, a decoder/encoder pair 102-$i$, 106-$i$ can switch among the sites within a conference.

The decoded video information (e.g., pixels) is scaled up or down, if necessary, by a pixel scaling block 104-$i$ to match the pixel resolution requirements of other sites in the conference that will be encoding the scaled pixels. For example, a desktop system may encode at a resolution of 256×240 pixels while an H.320 terminal may require a pixel resolution of 352×288 pixels for a Common Intermediate Format (CIF) image. Other common formats include Quarter Common Intermediate Format (QCIF) (176×144 pixels), SQCIF (128× 96), 4CIF (704×576), SIF (352×240), 4SIF (704×480), VGA (640×480), SVGA (800×600), XGA (1024×768) and "w720p" (1280×720).

The VPU 124 includes a pixel bus 182 and memory 123. The system disclosed in U.S. Pat. No. 5,600,646 uses a time division multiplex bus. In the embodiment disclosed herein, the pixel data is not identified and separated by time slots on pixel bus 182. Rather, the decoded pixels from each video source are temporarily stored in memory 123 (addressable RAM). Thus, instead of fetching pixel data by reading from the bus at certain time slots reserved for the respective inputs as disclosed in the '646 patent, the RAM is addressed to read out the pixel data of interest onto the bus at the time the data is needed.

In particular, each decoder 102-j outputs pixels onto pixel bus 182 to memory 123. Each encoder 106-j may retrieve any of the images from the memory 123 on the pixel bus for re-encoding and/or spatial mixing or compositing. Another pixel scaling block 108-j is coupled between the pixel bus 182 and the encoder 106-j for adjusting the pixel resolution of the sampled image as needed.

Figure 3:
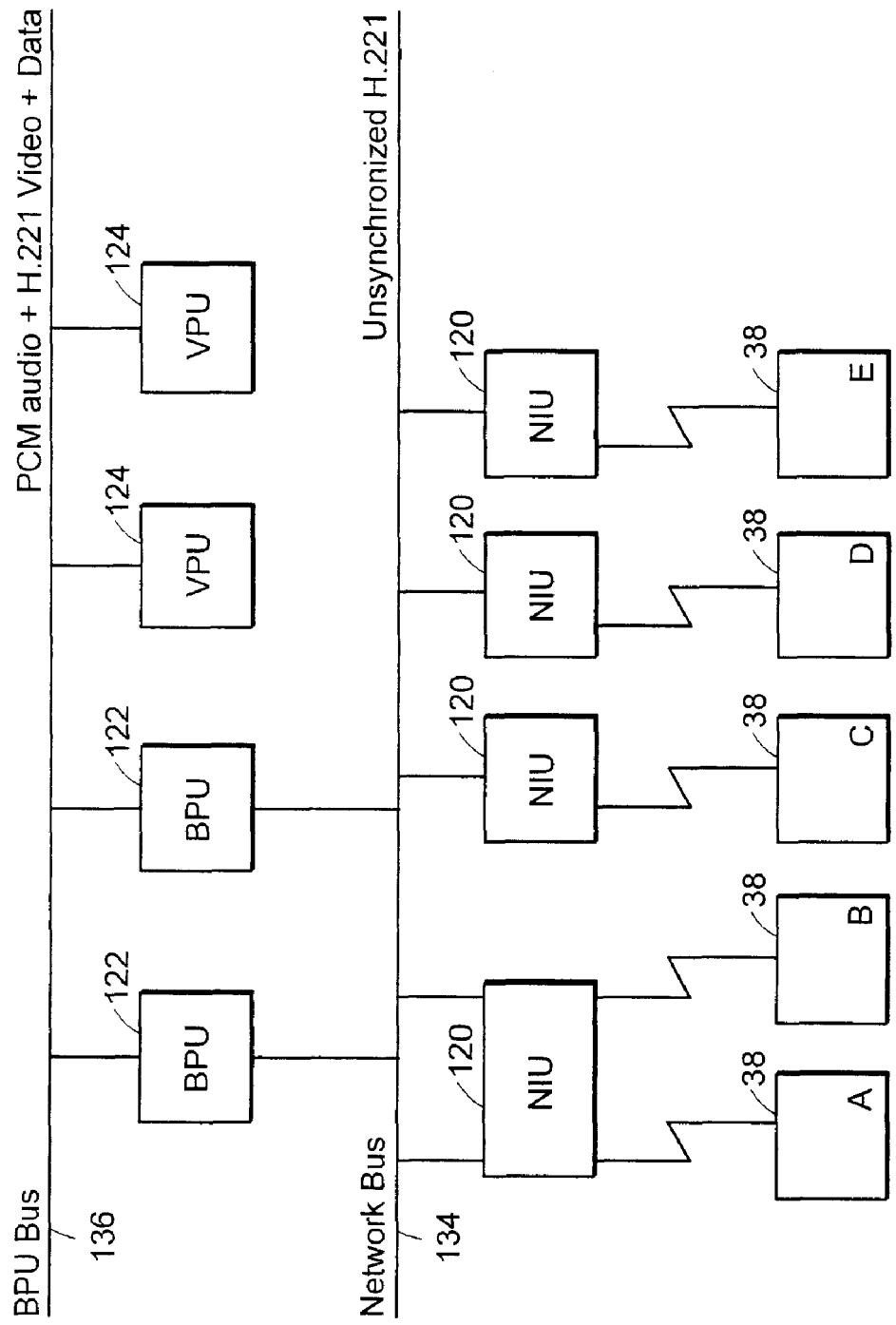
FIG. 3 is a block diagram of an MCU configuration illustrating data flow for continuous presence conferencing.
Figure 4:
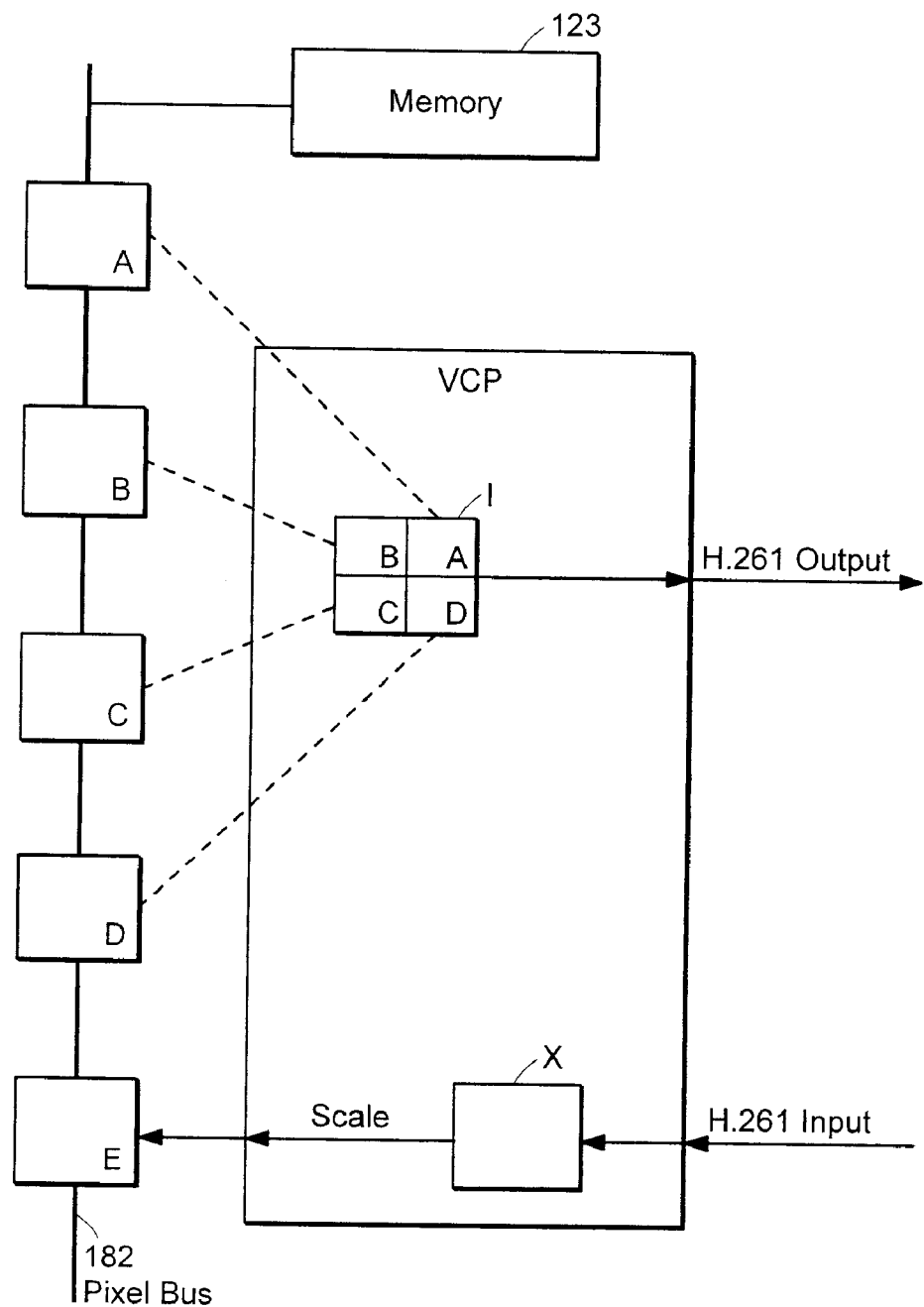
FIG. 4 is a block diagram illustrating image tiling in a continuous presence conference.

A continuous presence application is now described with reference to FIGS. 3 and 4. For simplicity the endpoint terminals as shown are H.320 terminals. In FIG. 3, data from sites 38 arrive over a communications network to respective NIUs 120. Five sites 38 (A, B, C, D, E) are connected in the conference. Sites A and B are shown connected to a particular NIU 120 which supports multiple codec connections (e.g., a T1 interface). The other sites C, D, and E connect to NIUs 120 supporting only a single codec connection (e.g., an ISDN interface). Each site 38 places one or more octets of digital data onto the network bus 134 as unsynchronized H.221 framed data. The BPUs 122 then determine the H.221 framing and octet alignment. This aligned data is made available to all other units on the BPU bus 136. The BPUs 122 also extract audio information from the H.221 frames and decode the audio into 16 bit PCM data. The decoded audio data is made available on the BPU bus 136 for mixing with audio data from other conference sites.

Aligned H.221 frames are received by the VPU 124 for processing by encoder/decoder elements called video compression processors (VCPs). The VPU 124 has five VCPs (FIG. 2) which in this example are respectively assigned to sites A, B, C, D, E. A VCP on the VPU 124 which is assigned to site E is functionally illustrated in FIG. 4. Compressed video information (H.261) is extracted from the H.221 frames and decoded by the VCP as image X. The decoder video image X is placed on the pixel bus 182 through a scaling block. FIG. 4 shows the pixel bus 182 with decoded video frames from each site A, B, C, D, E successively retrieved from memory 123 identified by their respective RAM addresses. The VCP assigned to site E receives the decoded video frames from sites A, B, C and D which are then tiled (spatially mixed) into a single composite image I. The tiled image I is then encoded as H.261 video within H.221 framing and placed on the BPU bus 136 (FIG. 3) for BPU processing as described above.

A similar process can be used to provide transcoding for sites that use different bandwidths. In particular, U.S. Pat. No. 5,600,646 discloses bandwidth transcoding, also referred to as rate matching. Taking into account the embodiment described above for an MCU having a VPU configured with memory accessible across a pixel bus, the processing is similar as described therein.

Having described an embodiment of a video conferencing system capable of continuous presence conferencing, an improved continuous presence capability of the present invention is now described which provides dynamic picture layout based on properties derived from conferencing signals, including video signals and control signals.

The present approach allows an MCU operating in continuous presence mode to automatically select the "best impression" for viewing at the endpoint sites without requiring any user intervention. The best impression may include appropriate or ideal picture layout, resolution and bandwidth. The selection is made according to procedures that take into account properties derived from video signals received from the endpoints. In addition, the selection may take into account the number of participants in the conference and control signals of the endpoints.

The MCU adjusts the picture layout according to the following procedures.

Figure 5:
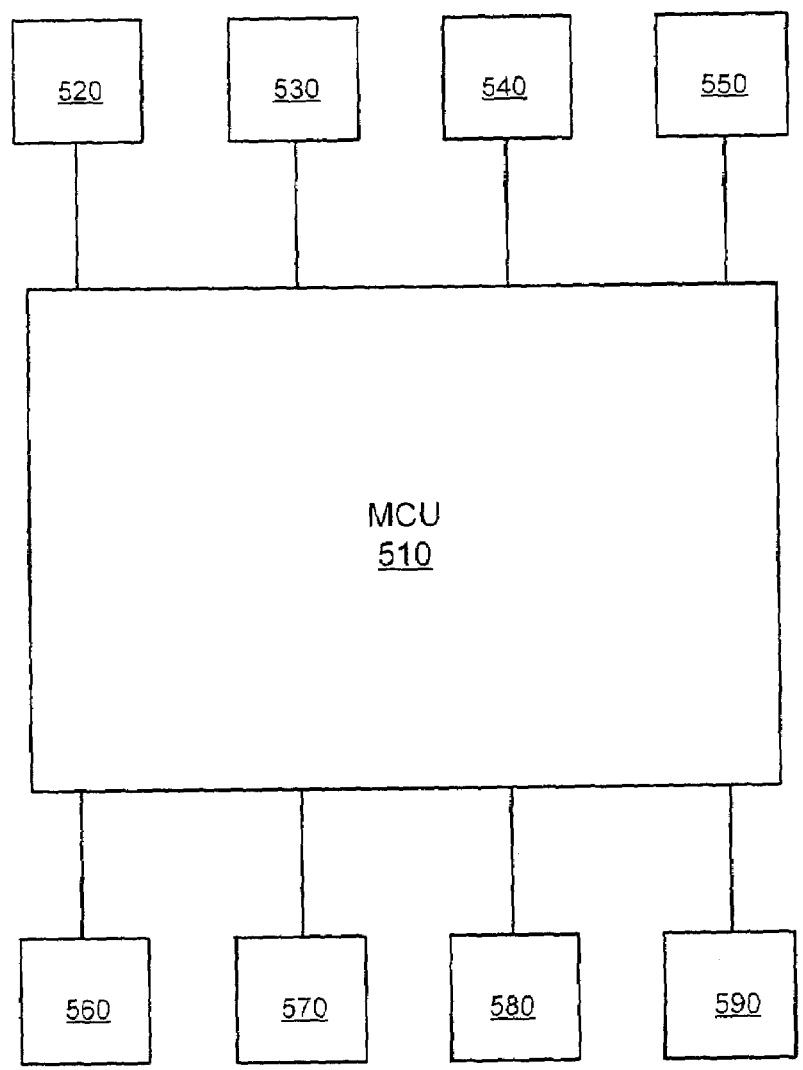
FIG. 5 illustrates a conference arrangement with multiple connected sites.

FIG. 5 shows an example configuration of eight participants (sites 520, 530, 540, 550, 560, 570 and 580), any number of which may be connected to an MCU 510 to communicate in a video conference. With one or two participants, the MCU may process the video signals from the participants to display a picture layout with full screen showing each participant. Note that the parts of the screen not covered with a picture may be filled with a background color, logo or other image.

Figure 6:
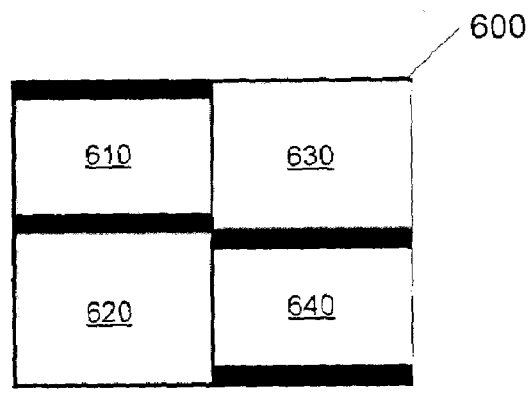
FIG. 6 illustrates an image layout for two framed 16:9 video signals and two 4:3 video signals.

Consider the case in which four video signals received at the MCU from among sites 520, 530, 540, 550, 560, 570 and 580 are to be combined for composite display. For example, two of the received video signals may have a picture aspect ratio of 16:9 and the other two may have a picture aspect ratio of 4:3. In this case, a four region or quadrant image layout, referred to as CP4, may be selected to form the composite image 600 shown in FIG. 6. In the particular image layout shown, the MCU displays each of the 16:9 sub-pictures 610, 640 with a frame or "letterboxing" in order to fit each 16:9 sub-picture into respective 4:3 sub-picture areas. The two 4:3 sub-pictures 620, 630 are displayed normally without the need for cropping or letterboxing. The letterboxing of the 16:9 sub-pictures reduces the quality impression of the composite image.

A better approach is for the MCU to select an image layout having some number of 16:9 sub-picture areas and some number of 4:3 sub-picture areas so that each displayable video signal can be displayed within an appropriate sub-picture area.

Accordingly, in an embodiment, based on the number of received video signals to be displayed and the respective picture aspect ratios, the MCU is configured to select an appropriate layout and place received 4:3 pictures into 4:3 sub-picture areas and received 16:9 pictures into 16:9 sub-picture areas within the composite image.

A conference participant may send zero, one or multiple video signals simultaneously and the MCU can be configured to show zero, one or more of them within the composite layout.

FIGS. 7-10 illustrate several image layouts having different mixes of 16:9 and 4:3 sub-pictures as may be implemented by in embodiments of an MCU in accordance with the present approach.

Figure 7:
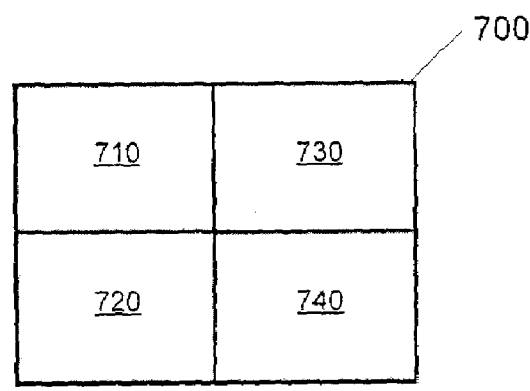
FIG. 7 illustrates an image layout for a conference arrangement having up to four displayable 4:3 video signals.

In particular, FIG. 7 illustrates an image layout (CP4) for a conference arrangement having up to four displayable 4:3 video signals 710, 720, 730 and 740 to form composite image

Figure 8:
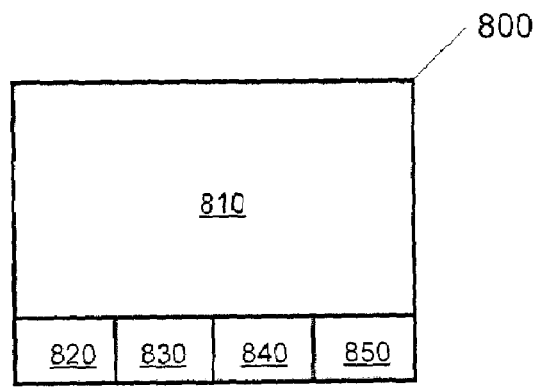
FIG. 8 illustrates an image layout for a conference arrangement having up to four displayable 4:3 video signals and one displayable 16:9 video signal.

700. FIG. 8 illustrates an image layout (referred to as "CP1w+4") for a conference arrangement having up to four displayable 4:3 video signals 820, 830, 840, 850 and one displayable 16:9 video signal 810 to form composite image 800.

Figure 9:
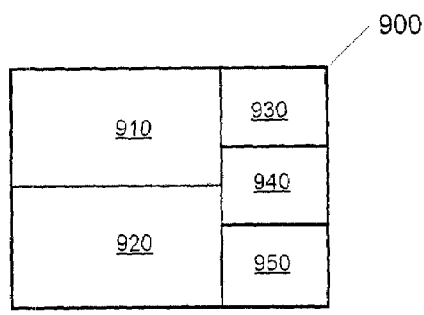
FIG. 9 illustrates an image layout for a conference arrangement having up to three displayable 4:3 video signals and two displayable 16:9 video signals.
Figure 10:
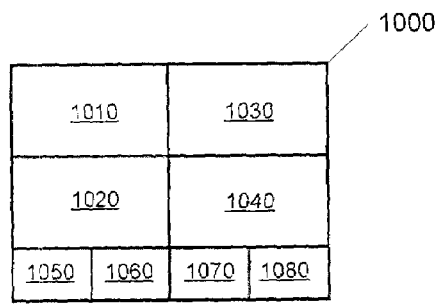
FIG. 10 illustrates an image layout for a conference arrangement having up to four displayable 4:3 video signals and up to four displayable 16:9 video signals.

FIG. 9 illustrates an image layout (referred to as "CP2w+3") for a conference arrangement having up to three displayable 4:3 video signals 930, 940, 950 and two displayable 16:9 video signals 910, 920 to form composite image 900. FIG. 10 illustrates an image layout (referred to as "CP4w+4") for a conference arrangement having up to four displayable 4:3 video signals 1050, 1060, 1070, 1080 and up to four displayable 16:9 video signals 1010, 1020, 1030, 1040 to form composite image 1000.

The following layout selection scheme can be applied for 0 to 4 video signals with 4:3 picture aspect ratio and 0 to 4 video signals with 16:9 picture aspect ratio:

| | | Number of displayable 16:9 video signals | | | |
|---|---|---|---|---|---|
| Layout Selection | 0 | 1 | 2 | 3 | 4 |
| Number of displayable 4:3 video signals | 0 | — | (see text) | (see text) | CP4w + 4 | CP4w + 4 |
| | 1 | (see text) | (see text) | CP2w + 3 | CP4w + 4 | CP4w + 4 |
| | 2 | (see text) | CP1w + 4 | CP2w + 3 | CP4w + 4 | CP4w + 4 |
| | 3 | CP4 | CP1w + 4 | CP2w + 3 | CP4w + 4 | CP4w + 4 |
| | 4 | CP4 | CP1w + 4 | CP4w + 4 | CP4w + 4 | CP4w + 4 |

For example, a conference in which there are three displayable 4:3 video signals and two displayable 16:9 video signals has an image layout CP2w+3 according to FIG. 9. If during the conference a third displayable 16:9 video signals is to be combined into the composite image, then the MCU reconfigures the composite image to the image layout CP4w+4 of FIG. 10. Likewise, if the conference video signals are changed such that only one 16:9 video signal is to be combined into the composite image, then the MCU reconfigures the composite image to the image layout CP1w+4 of FIG. 8.

The table does not apply to cases with one to two conference participants. In the case of two participants, the MCU may forward the incoming video signals to the other participant in a full screen layout. In case of one participant, the MCU may show a logo or another image to the only participant or it may send the incoming video back to the sender.

In some cases there will be unused sub-pictures. These sub-pictures not used to display an incoming video signal may be filled with a background color, logo or another image.

It should be understood that if more displayable video signals are connected to the MCU than shown in the table above, more image layouts can be added that show a higher number of participants or only a subset of all connected participants can be shown.

An advantage of the present approach is that no incoming 16:9 video signal need be fit into a 4:3 sub-picture of an image layout and vice versa. That is, most if not all incoming video signals can be shown in suitable sub-pictures.

It should be noted that in certain embodiments, the received picture aspect ratio may slightly deviate from the aspect ratio of the selected sub-picture. For example, the picture aspect ratio of the common CIF format (352×288) is around 8% wider than the 4:3 picture aspect ratio. Also the sub-pictures may not be exactly 4:3 shaped due to implementation constraints. There exist different techniques to fit the pictures into sub-pictures of the composite image with a slight picture aspect ratio deviation such as "squeezing" and "stretching".

As a practical matter, any anamorphic distortions resulting from these techniques are nearly invisible.

The foregoing has described dynamic layout selection based on picture aspect ratio. The following description relates to dynamic layout selection based on received picture resolution. In this aspect, based on the picture resolution of the received video signals, embodiments of the MCU may be configured to select an appropriate layout and place high resolution pictures in large sub-pictures and low resolution pictures in small sub-pictures within the composite image.

Figure 11:
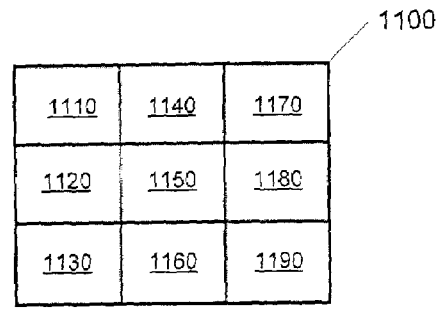
FIG. 11 illustrates an image layout for a conference arrangement having up to nine displayable video signals.
Figure 12:
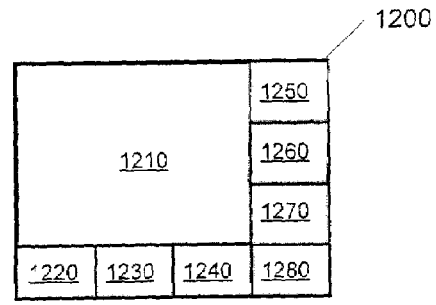
FIG. 12 illustrates an image layout for a conference arrangement having up to seven displayable video signals of low resolution and one displayable video signal of high resolution.

For example, consider a conference in which one participant sends a video signal having 704×576 pixel resolution and up to seven participants send video signals having 176×144 pixel resolution. The MCU may select a composite image layout as shown in FIG. 11. The layout (referred to as "CP9") in FIG. 11 illustrates nine equal size regions for respective sub-pictures 1110, 1120, 1130, 1140, 1150, 1160, 1170, 1180, 1190 to form composite image 1100. However, the visual impression to users is better when the MCU is configured to select the composite image layout shown in FIG. 12. In the layout of FIG. 12 (referred to as "CP1+7"), the one high resolution video signal is mapped to sub-picture 1210 and the seven low resolution video signals are mapped to sub-pictures 1220, 1230, 1240, 1250, 1260, 1270, 1280 to form composite image 1200.

Note that if the MCU detects transmission problems (e.g. high jitter or packet loss) from an endpoint to the MCU, the received image can be distorted. Even though this endpoint attempts to send a high resolution video signal, the picture can with advantage be handled as a low resolution picture in the context of the present approach when, e.g., the packet loss rate exceeds a predefined value. With this approach, the distortions will not be visible on a larger area of the screen.

In another aspect, dynamic layout selection may be based on the produced picture resolution at the MCU. In particular, based on the resolution of the generated video signal of the composite image, the MCU may be configured to select an appropriate layout so that the minimum sub-picture size does not fall below a certain threshold.

In some conferencing arrangements, an MCU may use a communication protocol such as H.323 to establish video signals. The communication protocol may in addition provide information about the allowed or expected properties of the video signals. This information can supplement or substitute the properties derived from received video signals for the process to determine the composite image layout. For example in H.323, before a system starts sending a video signal, it sends a message (openLogicalChannel) that may include information about a range or a set of video signal properties to be used for the video signal. For example, the openLogicalChannel message may include information that the picture resolution is to be CIF, QCIF or SQCIF which means in addition that the picture aspect ratio is to be near 4:3. This information is available already before the video signal is sent and can therefore be used by the MCU to select an appropriate layout. When the video signal becomes available, the derived properties can be used to refine or redefine the layout selection based on the knowledge that a particular resolution is received.

Consider the more general case of system A (e.g., an MCU) and system B (e.g., an endpoint) preparing to communicate in a video conference. In H.320/H.323, system A may send its receive capabilities, e.g., for a video channel: H.261 QCIF, CIF; H.263 SQCIF, QCIF, CIF; H.264 all resolutions up to w720p size. This means that system A can receive the given video standards with the given resolutions.

When system B attempts to open a video channel towards A, it signals which video standard is to be used in the video signal itself. In H.320, system B only sends which video standard will be used (e.g. "H.264"). In H.323, system B also includes information about the resolutions to be expected (e.g. "H.264 all resolutions up to CIF size"). Upon system B receiving an acknowledgement from system A, the video signal (rtp channel) is opened. System A then receives the video signal and is able to start decoding to determine which resolution it actually receives. The same procedure is observed in the other direction.

Two results flow from this process. In particular, system A may have information about a range or set of properties to be used to select a layout and resolution before system B starts sending. In addition, system A is able to control which (range of) resolutions it will receive by selecting the capabilities it sends to system B.

Thus, it should be clear that the information from the control protocol can be used for defining the composite image layout. In certain cases it can give valuable information, e.g., when it is known that the video standard is SQCIF or QCIF, then at least it is known that the image is to be small. Information such as "all resolutions up to w720p size" is likely of less value because the resolution can be, e.g., 176×144 or 1280×720, so it can be small or quite large. On the other hand, one could guess that a large resolution will be used because the systems often aim to maximize the quality and therefore make use of a resolution in the upper part of the allowed range. This means an initial guess may be that the resolution is to be large. Here we see that even in this case we can make a reasonable assumption already before receiving the video signals.

In a situation where the video signal of the composite image has a low resolution, e.g., it is sent to participants with a maximum resolution of 176×144 pixels, it is disadvantageous to select the composite layout of FIG. 12 (CP1+7) because some sub-pictures are too small. Rather, it is better to select the layout FIG. 4 (CP4).

As described, the MCU can be configured to support any number of picture layouts, with the MCU automatically changing between these layouts when at least one of the displayable video signals changes its associated video properties, the mix of video signals is changed, or the number of participants increases or decreases as sites are added or disconnected from an active conference. Note that while the foregoing has shown image layouts in which the regions are contiguous, other layouts can be used in which the regions are non-contiguous.

Further, the participants or sites are not limited to transmit only one single video signal. One site may e.g., transmit one video signal from a camera representing a picture of a presenter, and another video signal from a PC representing data from a presentation application (e.g., PowerPoint). Thus, the picture layout can be based in part on the number of video signals or sources rather than the number of participants.

To form the images shown in any of the continuous presence layouts described above, the composite image can be processed from the video signals received from the sites as described above with respect to FIGS. 1 to 4 of the MCU embodiment.

Figure 13:
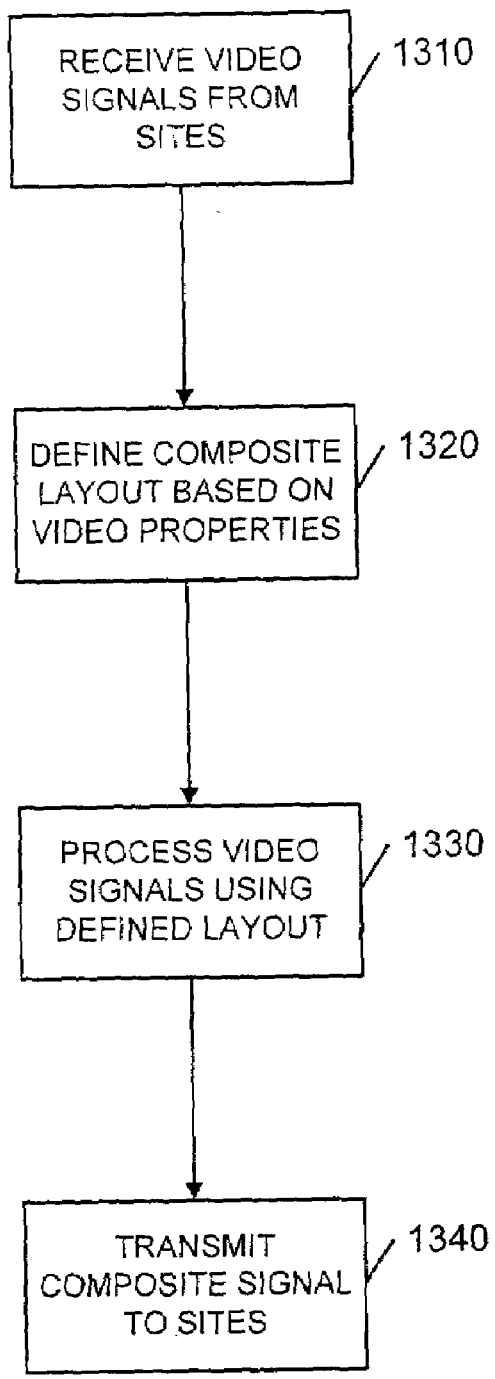
FIG. 13 illustrates a flow chart of a process for video conferencing.

A process for controlling the dynamic picture layout selection is shown in the example control flow diagram of FIG. 13 for a conference. At 1310, the MCU receives video signals from sites connected to a conference. At 1320, the MCU defines a composite image layout based on properties derived from the received video signals or control signals or both, such properties including aspect ratio and picture resolution.

At 1330, the MCU processes the received video signals to provide a composite signal according to the defined composite image layout. The MCU transmits the composite video signal to at least one of the connected sites at 1340. If the properties of the received video signals changes, or the number of video signals changes, then the MCU may redefine the image layout based upon rules defined as described herein above.

Those skilled in the art should readily appreciate that the present conferencing approach described herein is deliverable to a computer in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software entity executable by a processor or as a set of instructions embedded in a carrier wave. Alternatively, the operations and methods may be embodied in whole or in part using hardware components, such as Application Specific Integrated Circuits (ASICs), state machines, controllers or other hardware components or devices, or a combination of hardware, software, and firmware components.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of video conferencing comprising:
receiving conferencing signals from plural sites connected in a conference, the conferencing signals including video signals and control signals, the video signals including at least a first video signal at a 4:3 aspect ratio and a second video signal at a 16:9 aspect ratio;
after receiving the video signals, defining a composite image layout by deriving at least the 4:3 aspect ratio of the first video signal and the 16:9 aspect ratio of the second video signal derived from the received video signals, and causing said composite image layout to include a 16:9 sub-picture area and 4:3 sub-picture area for the second video signal at the 16:9 aspect ratio and the first video signal at the 4:3 aspect ratio, respectively, wherein the defining includes selecting the composite image layout from a plurality of options including CP4w+4 referring to four displayable 4:3 video signals and four displayable 16:9 video signals, CP2w+3 referring to three displayable 4:3 video signals and two displayable 16:9 video signals, and CP1w+4 referring to four displayable 4:3 video signals and one 16:9 video signal;
processing the received video signals to provide a composite video signal according to the defined composite image layout, wherein a 16:9 sub-picture and 4:3 sub-picture are simultaneously included in their corresponding sub-picture areas without letterboxing; and
transmitting the composite video signal to at least one of the connected sites.

2. The method of claim 1, further comprising:
upon at least one of the connected sites or at least one video signal changing its picture aspect ratio, redefining the composite image layout based on the picture aspect ratio of one or more of the received conferencing signals;

processing the received video signals to provide a second composite video signal according to the redefined composite image layout; and transmitting the second composite video signal to at least one of the connected sites.

3. The method of claim 1, further comprising:

upon at least one of the connected sites disconnecting from the conference or at least one video signal disconnecting, redefining the composite image layout based on properties derived from the received conferencing signals and on the number of sites currently connected in the conference or the number of video signals currently being received;

processing the received video signals to provide a second composite video signal according to the redefined composite image layout; and transmitting the second composite video signal to at least one of the connected sites.

4. The method of claim 1 further comprising:

upon at least one other site connecting to the conference or at least one other video signal being received, redefining the composite image layout based on properties derived from the received conferencing signals and on the number of sites currently connected in the conference or the number of video signals currently being received;

processing the received video signals to provide a second composite video signal according to the redefined composite image layout; and transmitting the second composite video signal to at least one of the connected sites.

5. A multipoint control unit for video conferencing, the multipoint control unit comprising:

an interface unit that receives conferencing signals from plural sites connected in a conference, the conferencing signals including video signals and control signals, the video signals including at least a first video signal at a 4:3 aspect ratio and a second video signal at a 16:9 aspect ratio;

a control processor that dynamically defines, after receiving the video signals, a composite image layout by deriving at least the 4:3 aspect ratio of the first video signal and the 16:9 aspect ratio of the second video signal from the received conferencing signals, and causing said composite image layout to include a 16:9 sub-picture area and 4:3 sub-picture area for the second video signal at the 16:9 aspect ratio and the first video signal at the 4:3 aspect ratio, respectively, wherein the control processor selects the composite image layout from a plurality of options including CP4w+4 referring to four displayable 4:3 video signals and four displayable 16:9 video signals, CP2w+3 referring to three displayable 4:3 video signals and two displayable 16:9 video signals, and CP1w+4 referring to four displayable 4:3 video signals and one 16:9 video signal; and a video processor that processes the received video signals to provide a composite video signal according to the defined composite layout, wherein a 16:9 sub-picture and 4:3 sub-picture are simultaneously included in their corresponding sub-picture areas without letterboxing.

6. The multipoint control unit of claim 5, wherein the control processor is further configured to redefine the composite image layout based on the picture aspect ratio of one or more of the received conferencing signals upon at least one of the connected sites or at least one video signal changing its picture aspect ratio.

7. The multipoint control unit of claim 5, wherein the control processor is further configured to redefine the composite image layout based on properties derived from the received conferencing signals and on the number of sites currently connected in the conference or the number of video signals currently being received upon at least one other site connecting to the conference or disconnecting from the conference or at least one other video signal being received or being disconnected.

8. An apparatus comprising:

means for receiving video signals from plural sites connected in a conference, the video signals including at least a first video signal at a 4:3 aspect ratio and a second video signal at a 16:9 aspect ratio;

means for dynamically defining, after receiving the video signals, a composite image layout by deriving at least the 4:3 aspect ratio of the first video signal and the 16:9 aspect ratio of the second video signal from the received video signals and causing said composite image layout to include a 16:9 sub-picture area and 4:3 sub-picture area for the second video signal at the 16:9 aspect ratio and the first video signal at the 4:3 aspect ratio, respectively, wherein the defining includes selecting the composite image layout from a plurality of options including CP4w+4 referring to four displayable 4:3 video signals and four displayable 16:9 video signals, CP2w+3 referring to three displayable 4:3 video signals and two displayable 16:9 video signals, and CP1w+4 referring to four displayable 4:3 video signals and one 16:9 video signal;

means for processing the received video signals to provide a composite video signal according to the defined composite image layout, wherein a 16:9 sub-picture and 4:3 sub-picture are simultaneously included in their corresponding sub-picture areas without letterboxing; and means for transmitting the composite video signal to at least one of the connected sites.

* * * * *